United States Patent [19]
O'Keefe et al.

[11] Patent Number: 5,922,951
[45] Date of Patent: Jul. 13, 1999

[54] GRAVITY GRADIOMETER

[75] Inventors: Graeme Joseph O'Keefe, Eltham; James Beresford Lee, New Lambton Heights; Robert John Turner, Salt Ash; Gregory John Adams, Kotara; Graham Clifford Goodwin, Rankin Park, all of Australia

[73] Assignee: The Broken Hill Proprietary Company Ltd., Victoria, Australia

[21] Appl. No.: 08/888,033

[22] Filed: Jul. 3, 1997

[30] Foreign Application Priority Data

Jun. 11, 1997 [AU] Australia .................................. PO7318
Jun. 12, 1997 [AU] Australia .................................. PO7314

[51] Int. Cl.$^6$ ........................................................ G01V 7/02
[52] U.S. Cl. ............................................................ 73/382 G
[58] Field of Search .................................... 73/1.38, 1.39, 73/382 R, 382 G; 702/2, 5

[56] References Cited

U.S. PATENT DOCUMENTS

| 4,188,816 | 2/1980 | Mairson .................................. 73/1.38 |
| 4,245,510 | 1/1981 | Baker . |
| 4,515,013 | 5/1985 | Hue . |
| 4,601,206 | 7/1986 | Watson . |
| 5,357,802 | 10/1994 | Hofmeyer et al. ..................... 73/382 G |

FOREIGN PATENT DOCUMENTS

| 651285 | 3/1979 | U.S.S.R. . |
| 2088564 | 6/1982 | United Kingdom . |
| WO95/05614 | 2/1995 | WIPO . |

*Primary Examiner*—John E. Chapman
*Attorney, Agent, or Firm*—Olson & Hierl, Ltd.

[57] ABSTRACT

This invention concerns improvements in the performance of a mobile gravity gradient instrument (GGI). Gravity gradiometers measure one or more components of the gradient of gravity which is expressed as the gradient of a gravity vector, or in other words a tensor. The instrument comprises a first, second, third and fourth accelerometer equally spaced around the circumference of a circle, with their sensitive axes tangential to the circle, and arranged in opposing pairs with the first accelerometer opposite the second, and the third accelerometer opposite the fourth. In use the accelerometers are spun around an axis normal to the circle which passes through its center. A summing amplifier receives the outputs of the accelerometers and combines them in a manner to cancel the common mode output signals and so produces all instrument output. One or more feedback loops extend from the instrument output to one or more of the accelerometers to compensate for errors. In general, the invention embraces the concept of balancing any feedback signal so that it is applied, after appropriate division (if required), to two or more of the accelerometers in appropriately inverted senses, rather than being applied to a single accelerometer.

10 Claims, 6 Drawing Sheets

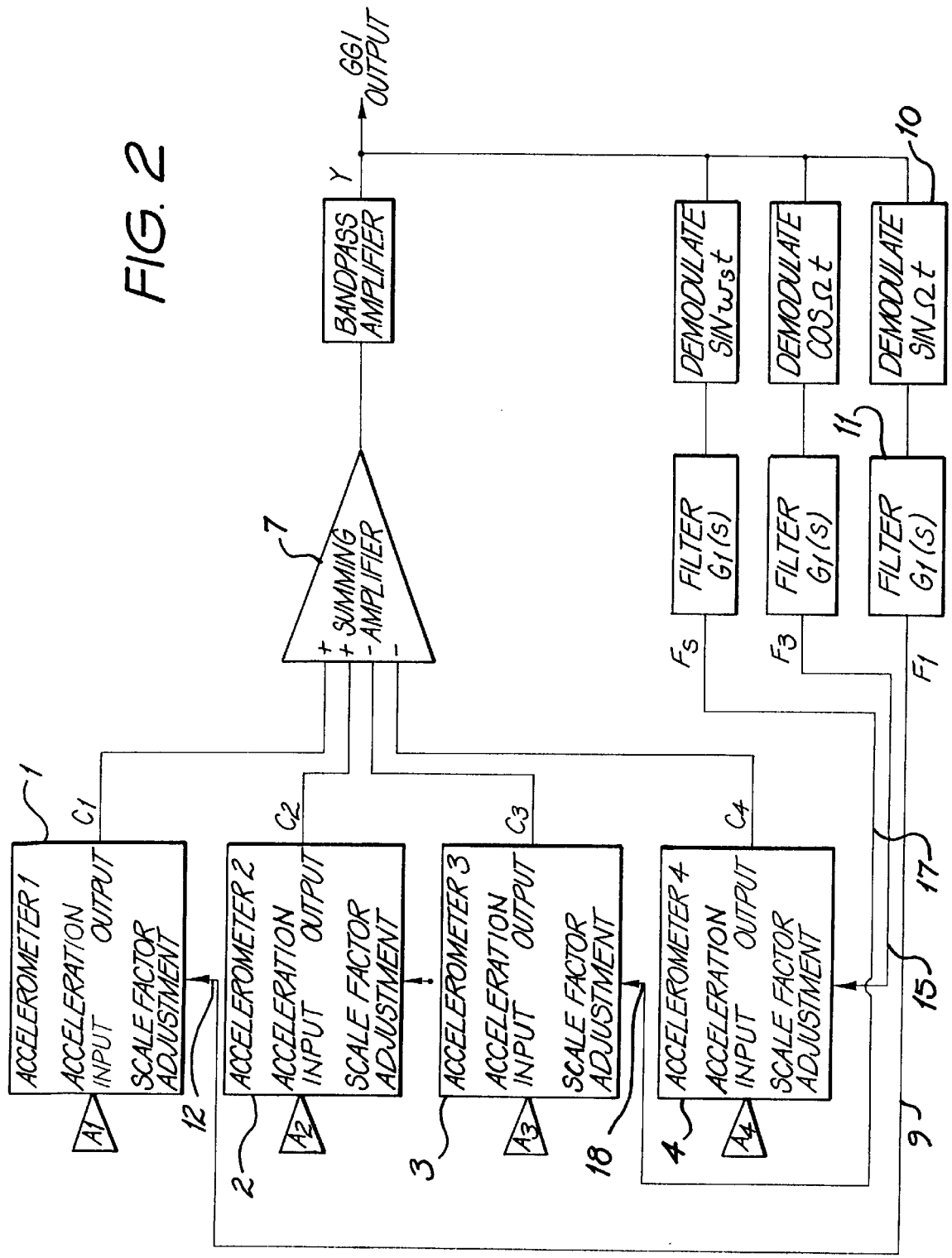

5,922,951

GRAVITY GRADIOMETER

TECHNICAL FIELD

This invention concerns improvements in the performance of a mobile gravity gradient instrument (GGI). Gravity gradiometers measure one or more components of the gradient of gravity which is expressed as the gradient of a gravity vector, or in other words a tensor, which may be written as follows:

$$\begin{vmatrix} g_{xx} & g_{yx} & g_{zx} \\ g_{xy} & g_{yy} & g_{zy} \\ g_{xz} & g_{yz} & g_{zz} \end{vmatrix} \text{units are Eotvos or in } 10^{-9} \text{ sec}^{-2}, \text{ or equivalent}$$

These devices should not be confused with gravimeters which measure the gravitational field, for instance by measuring the weight of a known mass within the gravitational field.

The Broken Hill Proprietary Company Limited is interested in improving the performance of the GGI in an aircraft for the purpose of detecting gravity disturbances caused by geological density anomalies associated with economic mineral deposits.

BACKGROUND ART

Measurements of gravity can be made from aircraft, and are routinely used in some resource exploration particularly petroleum exploration. A measurement of gravity gradient is preferred for detection of gravity disturbances from an airborne platform because the direct measurement of gravity cannot distinguish the gravity signal from accelerations of the instrument associated with the motion of the aircraft. This is particularly important at low altitude surveying preferred in mineral exploration to improve spatial resolution of the survey, because of the prevalence of atmospheric turbulence close to the ground surface. An ideal gravity gradient measurement will not be sensitive to the motion of the instrument.

The principal source of measurement noise (error) is residual sensitivity of the GGI to motion. The magnitude of gravity gradient signal expected from an economic mineral deposit is in the range 1–100 Eotvos [1 Eotvos=$10^{-9}$ (m/s$^2$)/m]. Accelerations experienced in a survey aircraft during low level surveys are generally of the order of 1–10 m/s$^2$ and the GGI has a baseline length of 0.1 to 0.4 m. The acceleration rejection of the GGI therefore must be of the order of one part in $10^9$.

SUMMARY OF THE INVENTION

The invention, as currently envisaged, is a gravity gradient instrument, comprising:

a first, second, third and fourth accelerometer equally spaced around the circumference of a circle, with their sensitive axes tangential to the circle, and arranged in opposing pairs with the first accelerometer opposite the second, and the third accelerometer opposite the fourth; in use the accelerometers are spun around an axis normal to the circle and passing through its center;

a summing amplifier which receives the outputs of the accelerometers and combines them in a manner to cancel the common mode output signals, to produce an instrument output; and one or more feedback loops extending from the instrument output to one or more of the accelerometers to compensate for errors: the feedback loops including one or more of the following feedback loops, taken either alone or in combination:

A first feedback loop, sensitive to a signal representing a first quadrature component of gravitational acceleration modulated by the rotation of the instrument, extending from the output and applying the fedback signal to scale factor adjustment means in the first accelerometer of a first pair and to scale factor adjustment means in the other accelerometer of the pair in all inverted sense. The feedback path may pass through a divider which halves the signal amplitude when compared to the feedback signal required when it is applied to a single accelerometer, so that only half the signal is fed back to the two accelerators.

A second feedback loop, sensitive to a signal representing a second quadrature component of gravitational acceleration modulated by the rotation of the instrument, extending from the output and applying the fedback signal to scale factor adjustment means in the first accelerometer of a second pair in an inverted sense. The feedback path may pass through a divider which halves the signal amplitude when compared to the feedback signal required when it is applied to a single accelerometer, so that only half the signal is fed back to the two accelerometers.

A third feedback loop, sensitive to a signal representing rotational accelerations about the spill axis, extending from the output and applying the fedback signal to scale factor adjustment means in both accelerometers of a first pair and to scale factor adjustment means in both accelerometers of the other pair in all inverse sense. The feedback path may pass through a divider which quarters the signal amplitude when compared to the feedback signal required when it is applied to a single accelerometer, so that only a quarter of the signal is fed back to the four accelerometers.

In general the invention embraces the concept of balancing any feedback signal so that it is applied, after appropriate division (if required), to two or more of the accelerometers in appropriately inverted senses, rather than being applied to a single accelerometer.

BRIEF DESCRIPTION OF THE DRAWINGS

An example of the invention will now be described with reference to the accompanying drawings, in which:

FIG. 2 is a block diagram of the conventional active feedback loops operating in the instrument of FIG. 1;

The same reference numerals have been used throughout the drawings to refer to corresponding features.

BEST MODES

Figure 1:
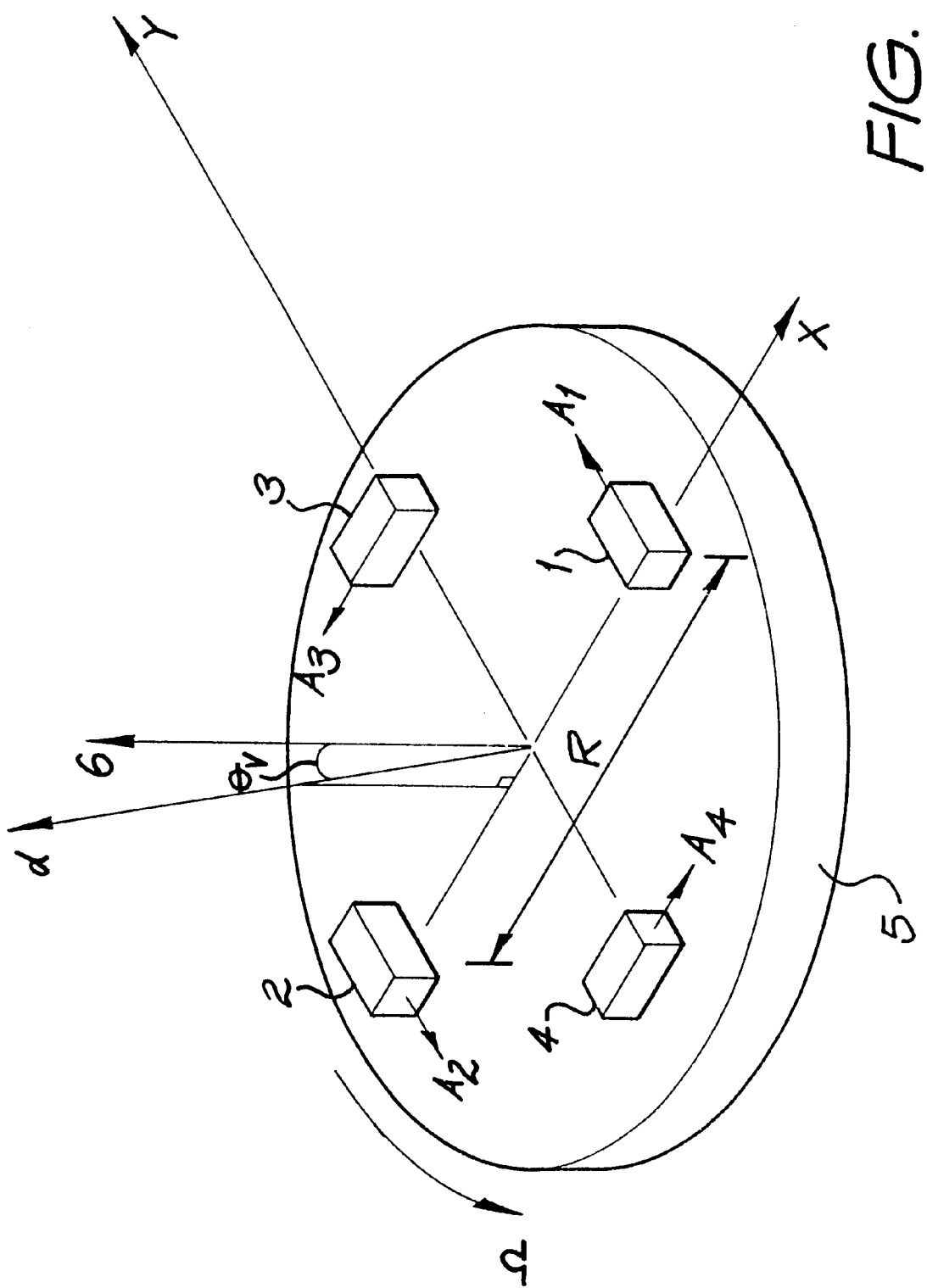
FIG. 1 is a schematic illustration of a known gravity gradiometers instrument having four accelerometers.
Figure 1A:
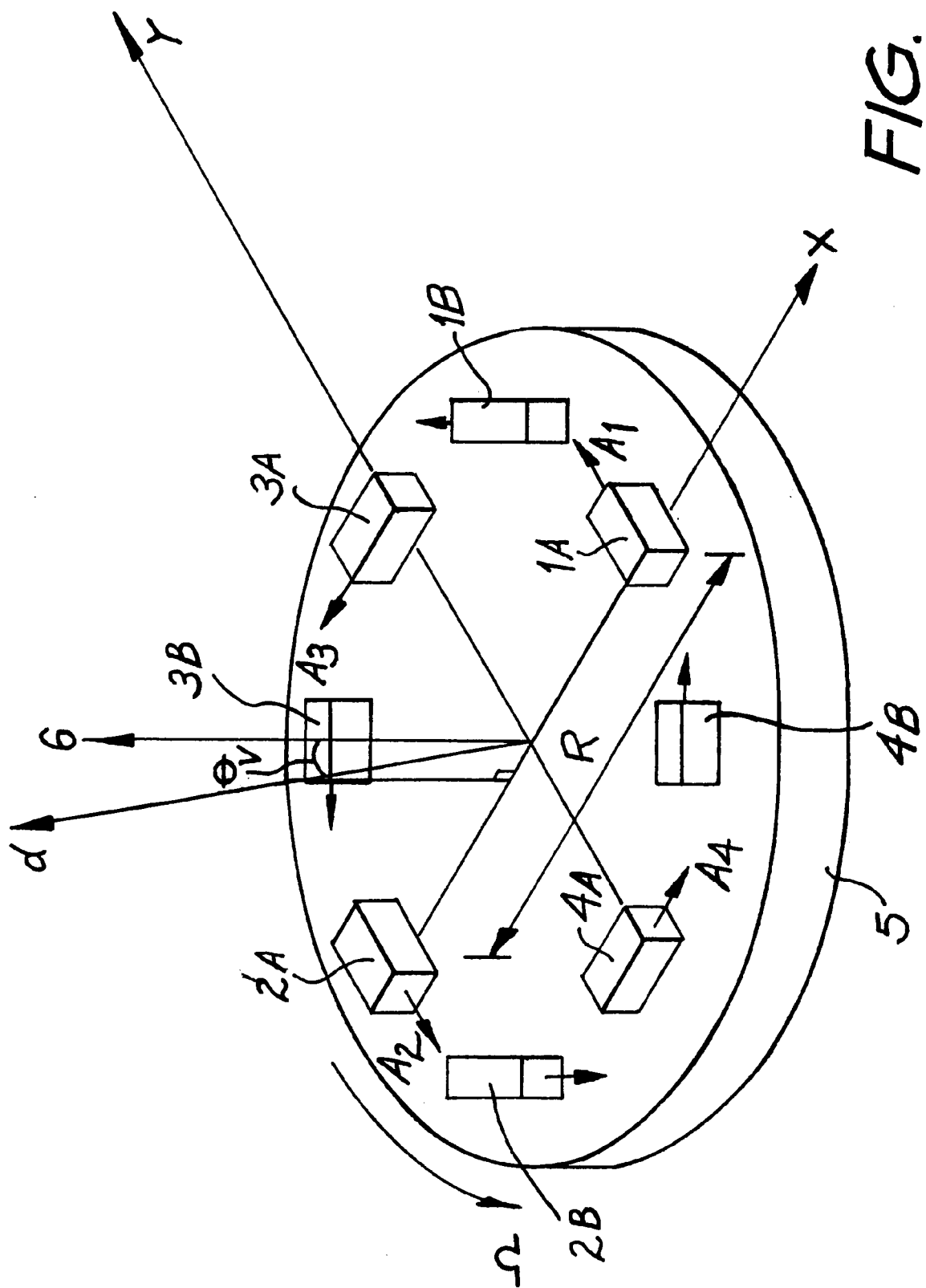
FIG. 1A is a schematic illustration of an alternate embodiment of FIG. 1 having eight accelerometers.

The GGI consists of four, 1, 2, 3 and 4 (or eight) high quality, low noise, matched accelerometers mounted on a block 5 as shown in FIG. 1 (the eight accelerometer GGI consists of eight 1A and 1B, 2A and 2B, 3A and 3B and 4A and 4B high quality, low noise, matched accelerometers can be considered for this discussion to be two separate sets of four accelerometers mounted oil the same block and the discussion will consider only a set of four). Each of the GGI accelerometers has mechanisms for trim adjustment of: the accelerometer scale factor, and the alignment of the accelerometer sensitive axis. The alignment trim adjustment is nominally about the accelerometer output axis.

The nominal configuration of the GGI accelerometers has the accelerometers 1, 2, 3 and 4 placed equally spaced oil the circumference of a circle, with their sensitive axes tangential to the circle. The block is rotated about an axis 6 (the spin axis) which is nominally and to a high precision perpendicular to the plane of the circle, and passes through the center of the circle. The rotation rate ($\Omega$) is usually 0.25 Hz and can vary from 0.25 Hz to 1.67 Hz. The outputs of the four accelerometers are combined by a summing amplifier 7 as shown in FIG. 2. This combining of the outputs must be done in a way which allows the large common mode accelerometer output signals to cancel to a high degree of precision, so that the residual differences which constitute the gradient signal are observable. In FIG. 2 the outputs from accelerometers 3 and 4 are subtracted from the outputs from accelerometers 1 and 2 to achieve common mode cancellation.

In the nominal configuration of the GGI and if the accelerometer sensitivities are exactly equal, the GGI is not sensitive to translational accelerations or to rotations about the spin axis. The GGI retains a sensitivity to the rate of rotation about axes in the plane of the circle (X and Y in FIG. 1), and this source of noise (error) is reduced to a negligible level by mounting the GGI in a high quality inertially stabilized gimbals.

The GGI will have a residual sensitivity to translational motion which is the result of, and proportional to, the difference in the sensitivities of each diametrically opposite pair of accelerometers.

The GGI incorporates active feedback control to continuously match the sensitivities of the accelerometers in each pair called Scale factor feedback. These feedback controls require there be a distinct signal in the GGI output which is the result of the mismatch of sensitivity of a pair of accelerometers. Such a signal occurs when the spin axis is inclined from the vertical 8. This results in each accelerometer sensing the gravitational acceleration modulated by the rotation of the GGI rotor. The resultant component of the GGI output is $\Delta_{12}$kg sin ($\theta_v$) sin ($\Omega$t) for one pair and $\Delta_{34}$kg sin ($\theta_v$) cos ($\Omega$t) for the other pair. The active feedback controls sense the magnitude of these signals by synchronous demodulation of the GGI output, and adjust the sensitivity of one of the accelerometers of the corresponding pair to null the signal $\theta_v$, is the angle by which the GGI spin axis is tilted from the vertical.

The GGI will have a residual sensitivity to rotational accelerations about the spin axis whenever there is a mismatch in the mean sensitivities of the two pairs of the accelerometers. The GGI also incorporates a feedback control to adjust this mismatch by adjusting the sensitivity of a third accelerometer called spin modulation, or scale factor pair feedback. This loop relies on active modulation of the GGI spin rate at another frequency (typically 1.8 Hz) to provide the feedback signal. The resultant component of the GGI output is ($\Sigma_{12}$K$-\Sigma_{34}$K)$\theta_s\omega_s^2$ sin ($\omega_n$t). The active feedback control senses the magnitude of this signal by demodulation of the GGI output, and adjust the sensitivity of one of the accelerometers of the set of four to null out the signal $\theta_s$ is the angular amplitude of the spin modulation.

The active feedback loops are shown schematically in FIG. 2. For each loop the output of the GGI is demodulated by multiplication by a sinusoidal signal at the frequency of the loop stimulus and in phase with the residual response to that stimulus. The demodulated signal is passed through a low pass filter including all integrator before being fed back to the appropriate accelerometer control point.

Improvement Of Compensation Loops

In the first scale factor feedback 9 the GGI output (Y) is first demodulated by a multiplication by sin($\Omega$t) and then filtered through the filter 11 represented by $G_1(s)$ to form the filtered signal $F_1$. The filter $G_1(s)$ includes all integrator so that the loop acts to completely null the DC signal.

This process results in $F_1$ representing the magnitude of the GGI output signal at frequency $\Omega$ and some noise related to the noise in the GGI output in the vicinity of $\Omega$ within the bandwidth of the filter $G_1(s)$. The component which is the magnitude of the in-phase component of the GGI output at $\Omega$ is the signal required by the feedback loop to adjust the scale factor of accelerometer 1, in order to correct for imbalance between the accelerometers 1 and 2.

The signal $F_1$ is then applied to adjust the scale factor 12 of accelerometer 1. For simplicity we consider that the scale factors of accelerometer 1 and accelerometer 2 are unity. Then the contribution to the GGI output of accelerometer 1 is $(1+F_1)$ times the acceleration it senses.

The acceleration experienced by accelerometer 1 is made up of a number of contributions which arise from the acceleration environment of the GGI and specific additional motions used as signals for the operation of feedback loops. The components we need to distinguish are: the gravitational acceleration (g); the environmental motion accelerations ($r=[r_x\ r_y\ r_z]$); the spin rate modulation applied for operation of the spin modulation feedback loop ($\theta_s$).

The accelerations experienced by the GGI accelerometers from these sources are shown in Table 1. Also included is the contribution from the gravity gradient signal (note that this component also includes signals from rotation rates of the GGI rotor).

TABLE 1

| Source | Accelerometer 1 | Accelerometer 2 | Accelerometer 3 | Accelerometer 4 |
|---|---|---|---|---|
| Gravity | g sin($\theta_v$) sin($\Omega$t) | $-$g sin($\theta_v$) sin($\Omega$t) | g sin($\theta_v$) cos($\Omega$t) | $-$g sin($\theta_v$) cos($\Omega$t) |
| Motion environment | $r_x$ cos($\theta_v$) sin($\Omega$t) +$r_y$ cos($\Omega$t) +$r_z$ sin($\theta_v$) sin($\Omega$t) | $-r_x$ cos($\theta_v$) sin($\Omega$t) $-r_y$ cos($\Omega$t) $-r_z$ sin($\theta_v$) sin($\Omega$t) | $r_x$ cos($\theta_v$) cos($\Omega$t) +$r_y$ sin($\Omega$t) +$r_z$ sin($\theta_v$) cos($\Omega$t) | $-r_x$ cos($\theta_v$) cos($\Omega$t) $-r_y$ sin($\Omega$t) $-r_z$ sin($\theta_v$) cos($\Omega$t) |
| Spin modulation | $\theta_s\omega_s^2$sin($\omega_s$t) | $\theta_s\omega_s^2$sin($\omega_s$t) | $\theta_s\omega_s^2$sin($\omega_s$t) | $\theta_s\omega_s^2$sin($\omega_s$t) |

TABLE 1-continued

| Source | Accelerometer 1 | Accelerometer 2 | Accelerometer 3 | Accelerometer 4 |
|---|---|---|---|---|
| Signal | $G_{xy} \sin(2\Omega t)$ $+G_{uv} \cos(2\Omega t)$ | $G_{xy} \sin(2\Omega t)$ $+G_{uv} \cos(2\Omega t)$ | $-G_{xy} \sin(2\Omega t)$ $-G_{uv} \cos(2\Omega t)$ | $-G_{xy} \sin(2\Omega t)$ $-G_{uv} \cos(2\Omega t)$ |

The signs of these components are important and determine the cancellation of terms in the GGI output. We note that the preferred frequencies for these modulations are around F for the GGI rotation; around 1.8 Hz for the spin modulation.

In the present configuration the contribution to the GGI output from the first scale factor loop 9 is the acceleration experienced by accelerometer 1 multiplied by the scale factor accelerometer 1, which we take as $1+F_1$. In the balanced state we note that the addition of outputs from accelerometers 1 and 2, in the absence of any feedback signal ($F_1=0$), cancels those terms which are of opposite sign for the two accelerometers. This leaves only the spin modulation and signal terms, and when the contribution of accelerometers 3 and 4 is subtracted, as it is in the GGI output, the spin modulation term is also cancelled. On the other hand the feedback signal which would consist entirely of noise when the accelerometers are in balance, contributes directly to the GGI output at frequencies determined by the frequency content of the acceleration experienced by accelerometer 1 alone. In particular there will be a contribution to noise: around $\Omega$ due to the gravity component; around $\omega_s$ due to the spin modulation component; and broadly over the frequency distribution of the motion accelerations, further broadened by the GGI rotation.

The first scale factor loop output $F_1$ is used to adjust the scale factors of accelerometers 1 and 2 in opposing directions. For the same feedback performance the signal applied to each accelerometer by scaler 13, is halved compared with the signal applied to the single accelerometer 1 in the current configuration. In addition the signal $S_2$ to accelerometer 2 is inverted, by inverter 14. The contribution from this feedback loop to the GGI output is then $(1+F_1)/2$ times the acceleration experienced by accelerometer 1 and $(1-F_1)/2$ times the acceleration experienced by accelerometer 2. This has the beneficial effect of cancelling the effect of those components of the acceleration which are of the same sign in accelerometers 1 and 2. In particular the spin modulation component is cancelled.

The function of the compensation loop to correct imbalance in the scale factors of accelerometers 1 and 2 is not effected by the improved configuration, as the driving signal for this action (shown in bold in Table 2) is not modified by the change to the configuration.

TABLE 2

| Source | Output Terms for Current Configuration | Output Terms for Improved Configuration |
|---|---|---|
| Gravity | $-g \sin(\theta_v) \sin(\Omega t)$ | $g \sin(\theta_v) \sin(\Omega t)$ |
| Motion environment | $r_x \cos(\theta_v) \sin(\Omega t)$ $+r_y \cos(\Omega t)$ $+r_z \sin(\theta_v) \sin(\Omega t)$ | $r_x \cos(\theta_v) \sin(\Omega t)$ $+r_y \cos(\Omega t)$ $+r_z \sin(\theta_v) \sin(\Omega t)$ |
| Spin modulation | $\theta_g \omega_g^2 \sin(\omega_g t)$ | |
| Signal | $G_{xy} \sin(2\Omega t)$ $+G_{uv} \cos(2\Omega t)$ | |

In summary the improvement of this loop reduces the noise in the GGI output around the spin modulation frequency.

The second scale factor loop 15 operates in the same manner as the first scale factor but in quadrature to it, so that it is sensitive to the scale factor imbalance of accelerometers 3 and 4. This is achieved by demodulation by $\cos(\Omega t)$16 rather than $\sin(\Omega t)$. The observations given for the improvement resulting from the improved configuration for the first scale factor loop 9 also apply to the second scale factor loop 15.

The function of the compensation loop to correct imbalance in the scale factors of accelerometers 3 and 4 is not effected by the improved configuration, as the driving signal for this action (shown in bold in Table 3) is not modified by the change to the configuration.

TABLE 3

| Source | Output Terms for Current Configuration | Output Terms for Improved Configuration |
|---|---|---|
| Gravity | $-g \sin(\theta_v) \cos(\Omega t)$ | $-g \sin(\theta_v) \cos(\Omega t)$ |
| Motion environment | $-r_x \cos(\theta_v) \cos(\Omega t)$ $-r_y \sin(\Omega t)$ $-r_z \sin(\theta_v) \cos(\Omega t)$ | $-r_x \cos(\theta_v) \cos(\Omega t)$ $-r_y \sin(\Omega t)$ $r_z \sin(\theta_v) \cos(\Omega t)$ |
| Spin modulation | $\theta_x \omega_s^2 \sin(\omega_s t)$ | |
| Signal | $-G_{xy} \sin(2\Omega t)$ $-G_{uv} \cos(2\Omega t)$ | |

Referring back to FIG. 2, in the spin modulation loop 17 the feedback signal $F_s$ adjusts the scale factor of accelerometer 3 and this leads to a contribution to the GGI output which is the acceleration experienced by accelerometer 3 modulated by $F_s$. In the improved configuration of FIG. 3 a quarter of feedback signal $F_s$ is used to adjust the scale factors of all four accelerometers with opposite polarity for the pair 1 & 2 relative to the pair 3 & 4 by means of scaler 18 and inverter 19 and 20. The effect of this is to cancel those of the acceleration terms which are of opposite sign for the two accelerometers of a pair. The resultant terms are shown in Table 4.

The function of the compensation loop to correct imbalance in the scale factors between accelerometer pairs is not affected by the improved configuration as the driving signal for this action (shown in bold in Table 4) is not modified by the change to the configuration.

TABLE 4

| Source | Output Terms for Current Configuration | Output Terms for Improved Configuration |
|---|---|---|
| Gravity | $g \sin(\theta_v) \cos(\Omega t)$ | |
| Motion environment | $r_x \cos(\theta_v) \cos(\Omega t)$ $+r_y \sin(\Omega t)$ $+r_z \sin(\theta_v) \cos(\Omega t)$ | |
| Spin modulation | $\theta_s \omega_s^2 \sin(\omega_s t)$ | $\theta_s \omega_s^2 \sin(\omega_s t)$ |
| Signal | $-G_{xy} \sin(2\Omega t)$ $-G_{uv} \cos(2\Omega t)$ | $-G_{xy} \sin(2\Omega t)$ $-G_{uv} \cos(2\Omega t)$ |

The effect of the improvement is to eliminate contributions to the GGI output from this source; around the spill rate $\Omega$ and broadly in the frequency range of the motion environment of the GGI. The operation of the spin modulation loop in transferring noise from around the spin modulation frequency to the signal band (01. To 0.9 Hz) by its interaction with the motion accelerations is a serious detriment to the performance of the GGI and is eliminated by the improved configuration.

In the FIG. 2 configuration the scale factor loops make a contribution to the output of the GGI in the region of the spin modulation frequency, but which is derived from the output of the GGI in the region of the GGI rotation frequency. Likewise the spin modulation loop makes a contribution to the output of the GGI around the GGI rotation frequency, but which arises from the GGI output around the spin modulation frequency. These effects will serve to amplify or increase the noise content in both these frequency bands by transferring noise between the two bands. The effect will be most severe around the rotation frequency, because this is within the signal frequency band.

As a result of the modifications to the feedback loops described with reference to FIG. 3, so far, these problems are ameliorated. A further benefit of the improved configuration of FIG. 3 comes from decoupling of the actions of the feedback loops. Stabilization of systems with multiple feedback loops is considerably easier if the loops do not interact strongly. This interaction arises because the feedback action of the scale factor loops, acting on only one accelerometer of the pair, changes the mean scale factor of the accelerometer pair. This creates all imbalance in the scale factors between the pairs and requires action of the spin modulation loop to compensate for the difference introduced between the scale factors of the accelerometer pairs.

A more serious interaction occurs between the second scale factor loop and the spin modulation loop since the action of the spin modulation loop is to adjust the scale factor of accelerometer 3, thereby inducing all imbalance between the pair of accelerometers of par 3 and 4 and requiring action of the second scale factor loop to compensate. Thus the second scale factor loop and the sill modulation loops are circularly linked.

Figure 3:
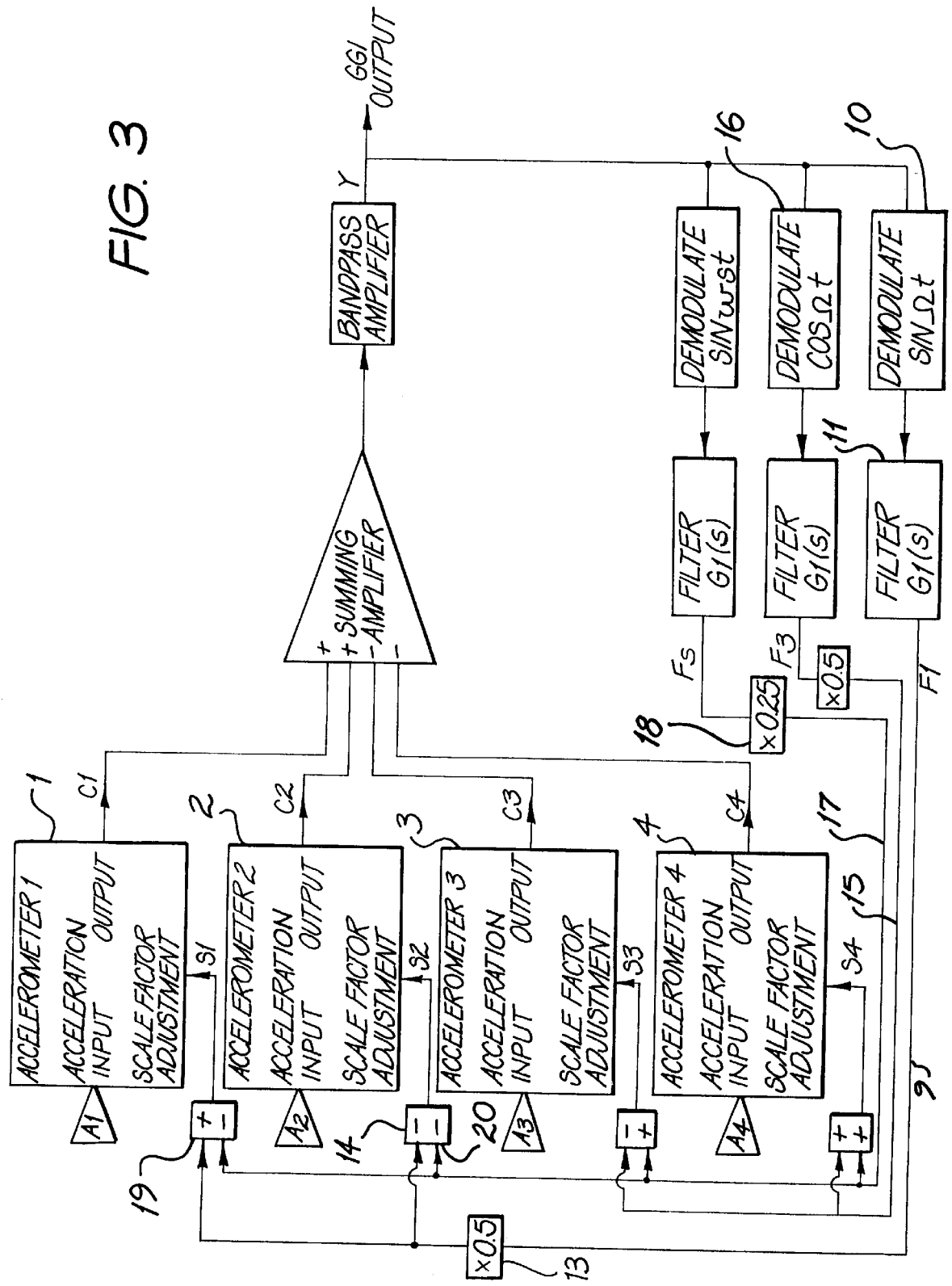
FIG. 3 is a block diagram of active feedback loops embodying features of the present invention.

The improved configuration of FIG. 3 eliminates the linking of feedback loops by balancing their outputs so that the output from each loop has no effect on the state of balance of the scale factors that any other loop is sensing.

The feedback loops of the GGI are implemented by a combination of analog and digital processing for adjustment of the accelerometer scale factors by applying a current through a coil to supplement the magnetic field which determines the accelerometer sensitivity. The preferred implementation of the improvement is to calculate the modified scale factor adjustments digitally before conversion to analog current to make the adjustment.

Figure 4:
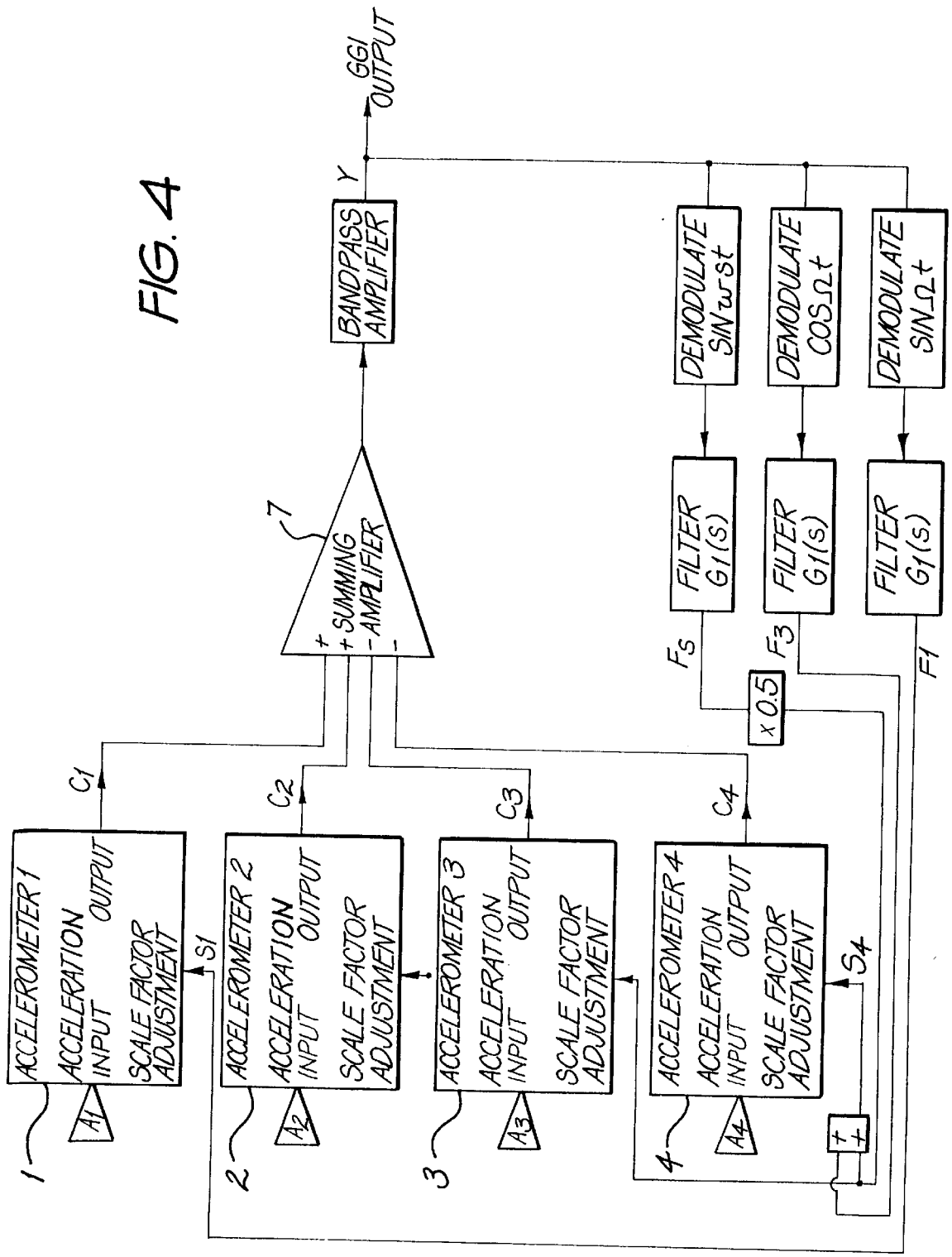
FIG. 4 is a block diagram of active feedback loops embodying alternative features of the present invention; and feature 5 is a block diagram of active feedback loops embodying more alternative features of the present invention.

An alternative part implementation is possible which achieves most of the benefit of the improved configuration. This configuration is shown in FIG. 4 and implements only partial balancing of the output of the spin modulation feedback loop.

Figure 5:
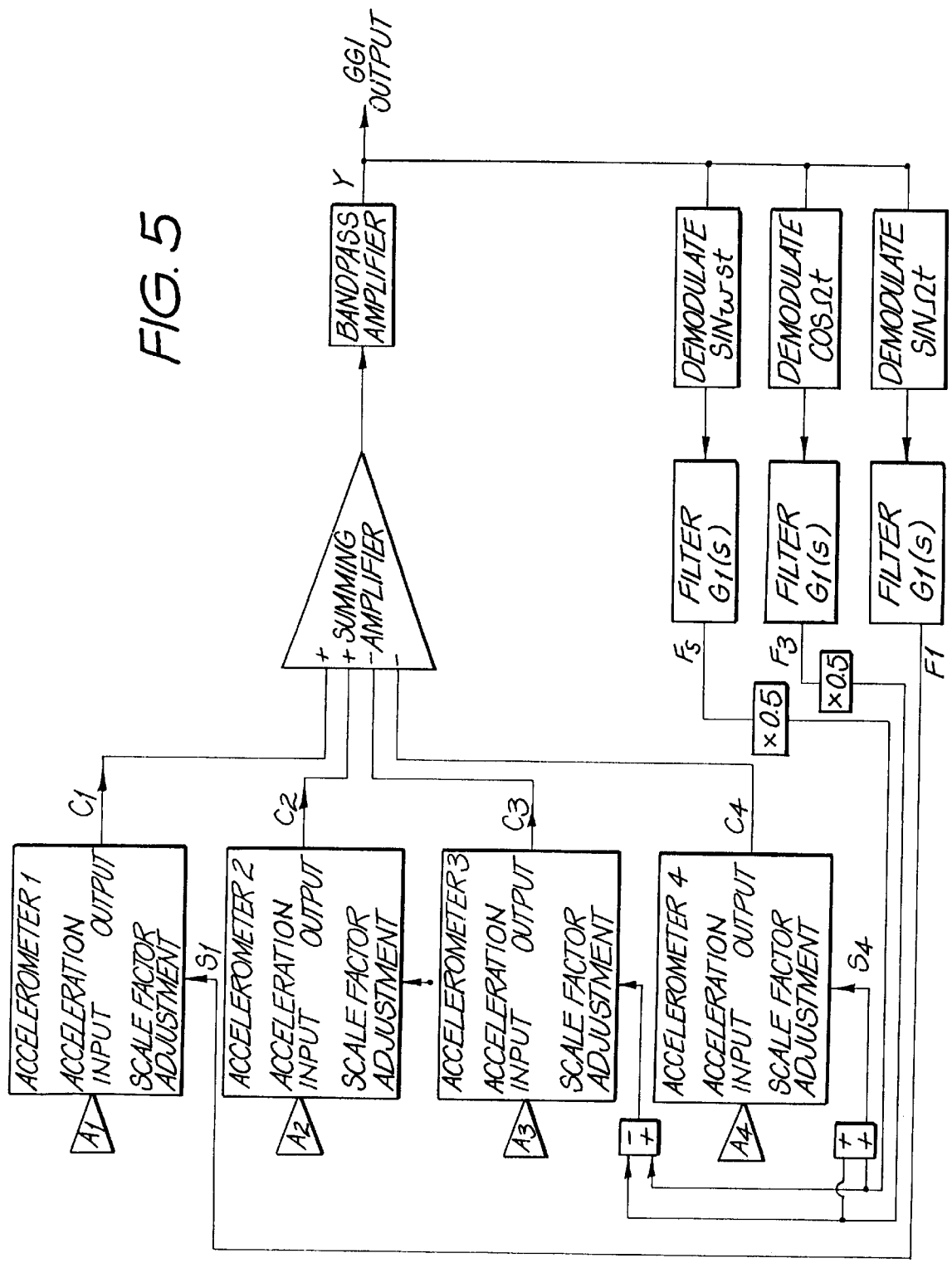

A further alternative part implementation is possible which achieves most of the benefit of the improved configuration. This configuration is shown in FIG. 5 and implements partial balancing of the output of the spin modulation feedback loop and balancing of the second scale factor adjustment loop.

There are three active feedback loops in the GGI and balancing of any of the loops or of any combination of loops is possible. The greatest benefit gained from balance of the loops described in the alternatives described above.

An alternative implementation is to perform the demodulation, filter and combination of feedback signals as analog signals. This is not preferred because the filter $G_1(s)$ and $G_2(s)$ require an integrator which is much easier to implement in a digital form. Any of the above digital implementations could be configured as analog equivalents.

Although the invention has been described with reference to particular embodiments it should be appreciated that it may be embodied in yet other forms, for instance, other compensation such as sensitive axis alignments and even order compensation also use compensation loops, and these loops could also be balanced in the same way that the scale factor compensation loops have been balanced in the description of the best orders.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A gravity gradient instrument, comprising:

a first, second, third and fourth accelerometer equally spaced around the circumference of a circle, with their sensitive axes tangential to the circle, and arranged in opposing pairs with the first accelerometer opposite the second, and the third accelerometer opposite the fourth, in use the accelerometers are spun around an axis normal to the circle and passing through its center;

a summing amplifier which receives the outputs of the accelerometers and combines them in a manner to cancel the common mode output signals, to produce an instrument output; and one or more feedback loops extending from the instrument output to two or more of the accelerometers to compensate for errors, wherein one or more of the feedback loops are balanced so that the feedback signal is applied to two or more of the accelerometers.

2. A gravity gradient instrument according to claim 1, wherein a signal amplitude of the feedback signal is divided before it is applied to the two or more accelerometers so that only half the signal is fed back to the two or more accelerometers.

3. A gravity gradient instrument according to claim 1, wherein the feedback signal that is fed back to one of the two or more accelerometers is inverted.

4. A gravity gradient instrument, comprising:

a first, second, third and fourth accelerometer equally spaced around the circumference of a circle, with their sensitive axes tangential to the circle, and arranged in opposing pairs with the first accelerometer opposite the second and the third accelerometer opposite the fourth, in use the accelerometers are spun around an axis normal to the circle and passing through its center;

a summing amplifier which receives the outputs of the accelerometers and combines them in a manner to cancel the common mode output signals, to produce an instrument output; and a first feedback loop, sensitive to a signal representing a first in-phase component of gravitational acceleration modulated by the rotation of the instrument, extending from the output and applying the feedback signal to scale factor adjustment means in the first accelerometer of a first pair and to scale factor adjustment means in the other accelerometer of the pair in an inverted sense.

5. A gravity gradient instrument according to claim 4, wherein the feedback path passes through a divider which halves the signal amplitude when compared to the feedback signal required when it is applied to a single accelerometer, so that only half the signal is fed back to the two accelerometers.

6. A gravity gradient instrument, comprising:

a first, second, third and fourth accelerometer equally spaced around the circumference of a circle, with their sensitive axes tangential to the circle, and arranged in opposing pairs with the first accelerometer opposite the second, and the third accelerometer opposite the fourth, in use the accelerometers are spun around an axis normal to the circle and passing through its center;

a summing amplifier which receives the outputs of the accelerometers and combines them in a manner to cancel the common mode output signals, to produce an instrument output;

a first feedback loop, sensitive to a signal representing a first in-phase component of gravitational acceleration modulated by rotation of the instrument, extending from the output and apply the feedback signal to scale factor adjustment means in the first accelerometer of a first pair and to scale factor adjustment means in the other accelerometer of the pair in an inverted sense; and a second feedback loop, sensitive to a signal representing a quadrature component of gravitational acceleration modulated by the rotation of the instrument, extending from the output and applying the feedback signal to scale factor adjustment means in the first accelerometer of a second pair and to scale factor adjustment means of a second accelerometer of a second pair in inverted sense.

7. A gravity gradient instrument according to claim 6 wherein the feedback path may pass through a divider which halves the signal amplitude when compared to the feedback signal required when it is applied to a single accelerometer, so that only half the signal is fed back to the two accelerometers.

8. A gravity gradient instrument, comprising:

a first, second, third and fourth accelerometer equally spaced around the circumference of a circle, with their sensitive axes tangential to the circle, and arranged in opposing pairs with the first accelerometer opposite the second, and the third accelerometer opposite the fourth, in use the accelerometers are spun around an axis normal to the circle and passing through its center;

a summing amplifier which receives the outputs of the accelerometers and combines them in a manner to cancel the common mode output signals, to produce an instrument output; and a third feedback loop, sensitive to a signal representing rotational accelerations about the spin axis, extending from the output and applying the feedback signal to scale factor adjustment means in both accelerometers of a first pair and to scale factor adjustment means in both accelerometers of the other pair in an inverse sense.

9. A gravity gradient instrument according to claim 8 wherein the feedback path passes through a divider which quarters the signal amplitude when compared to the feedback signal required when it is applied to a single accelerometer, so that only a quarter of the signal is fed back to the four accelerometers.

10. A gravity gradient instrument according to claim 1 wherein there are eight accelerometers arranged in four pairs and one or more feedback loops extending from the instrument output to two or more of the accelerometers to compensate for errors, wherein one or more of the feedback loops are balanced so that the feedback signal is applied to two or more of the accelerometers.

* * * * *